United States Patent [19]

Michaelson

[11] 4,350,551
[45] Sep. 21, 1982

[54] FLUID SLIP SHEET AND METHOD

[75] Inventor: Gary L. Michaelson, Kent, Wash.

[73] Assignee: The Boeing Company, Seattle, Wash.

[21] Appl. No.: 221,321

[22] Filed: Dec. 29, 1980

[51] Int. Cl.³ .............................................. B29C 19/00
[52] U.S. Cl. ..................................... 156/245; 156/242; 264/316; 264/322; 264/338
[58] Field of Search ....................... 264/316, 338, 322; 156/242, 245

[56] References Cited

U.S. PATENT DOCUMENTS 3,761,338  9/1973  Ungar et al. .......................... 156/219
4,271,116  6/1981  Jones .................................... 264/316

FOREIGN PATENT DOCUMENTS 901912  7/1962  United Kingdom .

Primary Examiner—James J. Bell
Attorney, Agent, or Firm—Christensen, O'Connor, Johnson & Kindness

[57] ABSTRACT

A composite part (10) and a mold (12) having different coefficients of expansion are allowed to move differentially while being cured under conditions in which both heat and pressure are applied to the mold and part. A sheet of flexible material (18) that is a solid at room temperature and a viscous liquid at the elevated curing temperature is placed between a pair of flexible parting films (14, 16). The resulting laminate is interposed between the part and the mold pair to subjecting them to elevated curing temperatures. The flexible material in the laminate becomes a liquid at the elevated curing temperatures and thus provides lubrication between the parting sheets so that the part can move relative to the mold.

6 Claims, 2 Drawing Figures

FLUID SLIP SHEET AND METHOD

BACKGROUND OF THE INVENTION

The present invention relates to a method for forming a structure composed of a graphite/epoxy composite material and more particularly to a method for conforming such composites precisely to the contour of a mold.

Aircraft components are currently being manufactured from graphite/epoxy composite materials. These composite materials must be very precisely formed when used as aerodynamic surfaces, especially wing surfaces, in order to meet critical aerodynamic tolerances that are required to reduce drag.

Fabrication of graphite/epoxy composites in many instances requires that precured or partially precured skins or other sheets of the composite material be combined with additional graphite/epoxy composite material and thereafter cured. Such composite structures, especially components that are intended to function as surface panels, are held with pressure against a mold. A typical mold is constructed of aluminum, steel or a fiberglass/epoxy composite; however, these materials have significantly different thermal expansion characteristics than does the graphite/epoxy material. When the graphite/epoxy material and an aluminum mold, for example, are heated under pressure, the aluminum mold expands faster than the precured skin. Sufficient friction exists between the skin and the mold surface to prevent relative movement between the two. This lack of relative movement induces strain in the precured skin during the curing cycle and causes the composite material to warp when cooled down and removed from the mold. As a consequence, the warped part is unacceptable as it cannot meet the critical tolerances required for aerodynamic surfaces.

Prior art attempts to solve the warping problem included post-aging of the part while forcing it to the desired contour. Another attempt required remachining of the mold to a contour that would, in essence, compensate for the stresses induced in the precured skin so that after it was cured, cooled, and removed from the mold, it would warp into the desired shape. These attempted solutions proved unsatisfactory, however, as they were either unsuccessful or added unnecessary expense.

SUMMARY OF THE INVENTION

In accordance with the present invention it was recognized that the warping problem was caused by a combination of factors including the thermal expansion differential between the precured graphite/epoxy skin and the mold, and the friction between the part and mold resulting from the high pressure applied to the part during the curing cycle, which prevented the part from moving independently of the mold. It was recognized that the resulting inability of the part to move generated strain in the part during the curing cycle resulting in distortion of the finished part. As a result, a method was achieved for providing independent movement or slippage of the part relative to the mold. The method preferably includes interposing a sheet of flexible material that is a solid at room temperature and a liquid at an elevated curing temperature between a pair of flexible parting films to form a lubricating laminate. The laminate is then interposed between the part and the mold, after which the mold, part, and laminate are heated to an elevated curing temperature, preferably under pressure. As the flexible material approaches the curing temperature, it becomes a liquid and forms a lubricating film between the two parting films, thus allowing the part and adjacent parting film to move independently of the mold, preventing any buildup of strain in the part as the curing cycle progresses. If, of course, the sheet of flexible material is easily separable from the part and mold upon cooling, one or both of the parting sheets need not be used.

BRIEF DESCRIPTION OF THE DRAWINGS

A better understanding of the present invention can be derived by reading the ensuing specification in conjunction with the accompanying drawings wherein.

DETAILED DESCRIPTION OF THE PRESENT INVENTION

Figure 1:
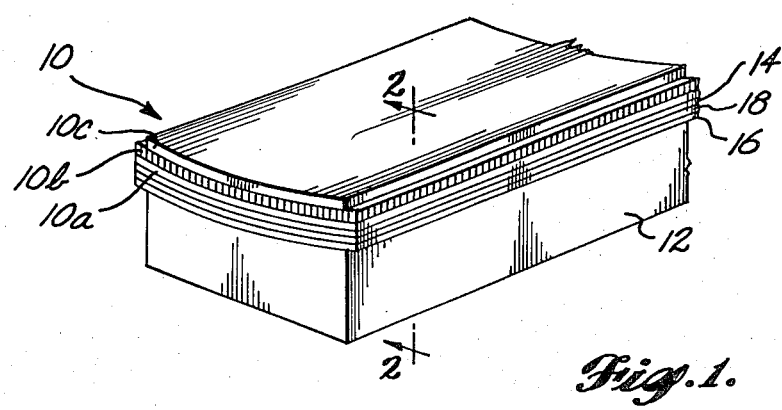
FIG. 1 is an isometric view of a composite part, a mold and the slip sheet of the present invention.

Referring first to FIG. 1, a composite part 10 is composed of a precured layer 10a of a graphite/epoxy composite material, a honeycomb core 10b, and an uncured reinforcing structure 10c composed of the same graphite/epoxy composite material. The entire part 10 is positioned on a mold 12 (sometimes referred to as a lay-up mandrel) having an upper surface with a predetermined contour, either planar or curved. During the curing process, heat and pressure are applied to the part 10 so that the surface of the precured layer 10a will conform to the contour of the upper surface of the mold.

Figure 2:
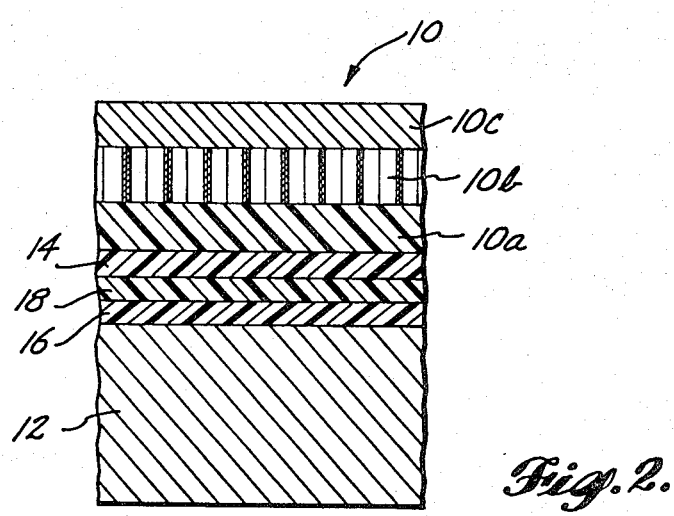
FIG. 2 is an enlarged cross-sectional view of a segment of the part, mold and slip sheet of the present invention.

Referring now to FIGS. 1 and 2, prior to positioning the part 10 on the mold 12 parting films 14 and 16 are placed respectively adjacent the surface of the precured layer 10a and adjacent the surface of the mold 12. A fluid slip sheet 18 is interposed between the parting films 14 and 16. Prior to curing, the mold, part, parting film, and fluid slip sheet are all at room temperature. At room temperature, both the parting films and the slip sheet are flexible solids. When, however, the part and mold are heated to elevated curing temperatures while pressure is being applied to the part, the fluid slip sheet melts and becomes a viscous fluid. The viscous fluid functions as a relatively friction-free lubricant between the two parting films 14 and 16, which remain flexible solids at the curing temperatures. Thus, the upper parting film as well as the precured layer 10a of the part 10 can move differentially relative to the lower parting film 16 and mold 12, preventing any stress buildup in the part 10. After the part 10 is cured and returned to room temperature, the part will conform exactly to the predetermined contour of the mold surface and thus not require any post-curing processing.

The parting sheet or film employed with the method of the present invention is of conventional manufacture and is available commercially. Any parting sheet or film that is inert relative to the composite part, mold and the fluid slip sheet is satisfactory. Of course, the parting film must be a solid at room temperature and remain a solid at elevated curing temperatures, which are normally in the range of 300° to 400° F. The parting film must be of the type of material that does not undergo a chemical change at elevated curing temperatures and must be readily separable from the composite material as well as the mold when all parts are returned to room temperature. Many parting films are produced from a fluorinated ethylene polymer (FEP). An example of a satisfactory commercially available polymer is an FEP sold under the registered trademark "Tedlar" by E.I. duPont de Nemours & Company. Although the thickness of the parting film is not critical, the parting film must, of course, be flexible. Parting films having thicknesses on the order of 0.003 to 0.008 inches have been found satisfactory.

The fluid slip sheet is preferably composed of a high-temperature, polymeric material. The material can be either thermoplastic or thermosetting. The main characteristic of the material is, however, that it must be a flexible solid at room temperatures and must melt to a relatively viscous liquid at elevated curing temperatures, on the order of from 300° to 400° F. At these temperatures, the fluid slip sheet must be able to function as a liquid lubricating layer between the two parting sheets as explained above. Again, the thickness of the fluid slip sheet is not critical, however, thicknesses on the order of 0.010 inches have been employed satisfactorily. An example of a satisfactory material for use as a fluid slip sheet is the high-temperature, thermosetting, epoxy material sold under the trade name FM300 by the American Cyanamid Company. This material is normally used as an epxoy adhesive and has a curing temperature on the order of about 350°. Its rheology dictates that it becomes a lubricating liquid at temperatures on the order of 300° F.

The foregoing system for eliminating friction-induced strain in graphite/epoxy composite material during the curing cycles simply and economically solves a problem heretofore encountered when graphite/epoxy parts were cured under heat and pressure on aluminum molds. Separation of the fluid slip sheet from the composite part and mold is easily achieved using parting films. Additionally, no problems are encountered with cleanup of the molds or adhesion of the slip sheet to the part. Although the present invention has been described in relation to a preferred embodiment, one of ordinary skill after reading the foregoing specification will be able to effect various alterations, substitutions of equivalents, and other changes without departing from the broad concepts taught herein. For example, if material of which the fluid slip sheet is composed is easily separable from either the mold or the part, use of one or both of the parting films can be eliminated. It is therefore intended that the scope of protection granted by Letters Patent hereon be limited only by the definition contained in the appended claims and equivalents thereof.

The embodiments of the invention in which an exclusive property or privilege is claimed are defined as follows:

1. A method for curing a part and allowing it to conform to the contoured surface of a mold, said mold and said part having dissimilar coefficients of expansion, comprising:

interposing a sheet of flexible material that is a solid at room temperature and a liquid at an elevated curing temperature between said part and said mold, heating said sheet, said mold, and said part to an elevated curing temperature, and allowing said part and said mold to move relative to one another as they differentially expand.

2. The method of claim 1 further comprising:

first interposing said sheet of flexible material between a pair of flexible parting sheets to form a laminate, and then interposing said laminate between said mold and said part.

3. The method of claim 2 wherein said liquid is a viscous lubricating liquid at said elevated curing temperature.

4. The method of claim 2 further comprising:

applying pressure to said part and said mold while heating.

5. The method of claim 1 or 3 wherein said sheet of flexible material comprises a high-temperature thermosetting epoxy polymer.

6. The method of claim 5 wherein said parting sheet comprises a fluorinated ethylene polymer.

* * * * *